United States Patent
Trupiano et al.

(10) Patent No.: US 11,894,152 B2
(45) Date of Patent: Feb. 6, 2024

(54) MODULAR THERMAL AND RADIATION SHIELDING WITH PASSIVE HEAT REMOVAL

(71) Applicant: Westinghouse Electric Company LLC, Cranberry Township, PA (US)

(72) Inventors: Anthony G Trupiano, Pittsburgh, PA (US); Adana L Stanish, Cranberry Township (PA); Jonathan C. Durfee, Mars, PA (US); William L Brown, Pittsburgh, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 202 days.

(21) Appl. No.: 17/308,353

(22) Filed: May 5, 2021

(65) Prior Publication Data
US 2022/0359095 A1 Nov. 10, 2022

(51) Int. Cl.
*G21C 15/257* (2006.01)
*G21F 5/10* (2006.01)
*G21C 13/00* (2006.01)

(52) U.S. Cl.
CPC ............. *G21C 15/257* (2013.01); *G21F 5/10* (2013.01); *G21C 13/00* (2013.01)

(58) Field of Classification Search
CPC .......... G21C 15/257; G21C 13/00; G21F 5/10
USPC ........................................ 376/367, 272, 909
See application file for complete search history.

(56) References Cited

U.S. PATENT DOCUMENTS

| | | | |
|---|---|---|---|
| 6,802,671 B1 | 10/2004 | Badie et al. | |
| 2016/0027536 A1 | 1/2016 | McClure et al. | |
| 2018/0268950 A1 | 9/2018 | McKellar | |
| 2022/0139671 A1* | 5/2022 | Drewery | H01J 37/321 |
| | | | 156/345.48 |

FOREIGN PATENT DOCUMENTS

| | | |
|---|---|---|
| JP | 2017125774 A | 7/2017 |
| WO | 2020210240 A1 | 10/2020 |
| WO | 2022236306 A2 | 11/2022 |

OTHER PUBLICATIONS

International Search Report and Written Opinion for corresponding International PCT Application No. PCT/US2022/072141, dated Nov. 28, 2022.

* cited by examiner

*Primary Examiner* — Jack W Keith
*Assistant Examiner* — Daniel Wasil
(74) *Attorney, Agent, or Firm* — K&L Gates LLP

(57) ABSTRACT

A housing assembly configured to house a reactor is disclosed. The housing assembly includes a plurality of modular walls configured to surround the reactor and a passive temperature control system. The plurality of modular walls includes a first modular wall. The passive temperature control system is coupled to the first modular wall. The passive temperature control system is configured to transfer heat between the reactor and an area around the housing assembly.

20 Claims, 13 Drawing Sheets

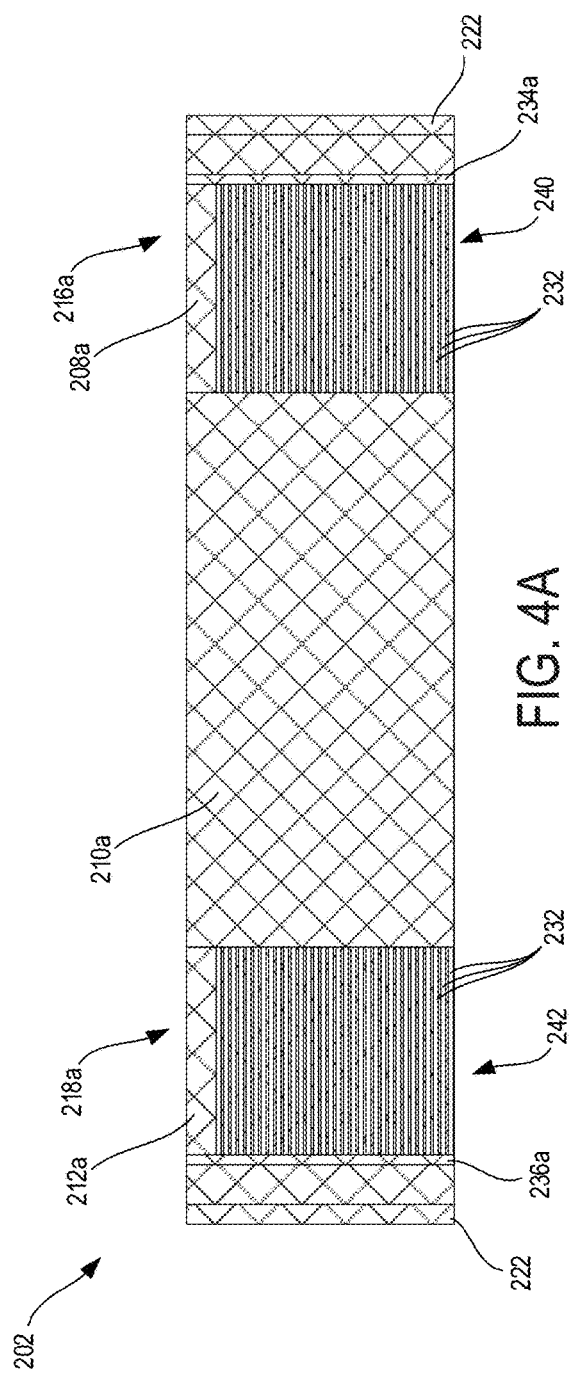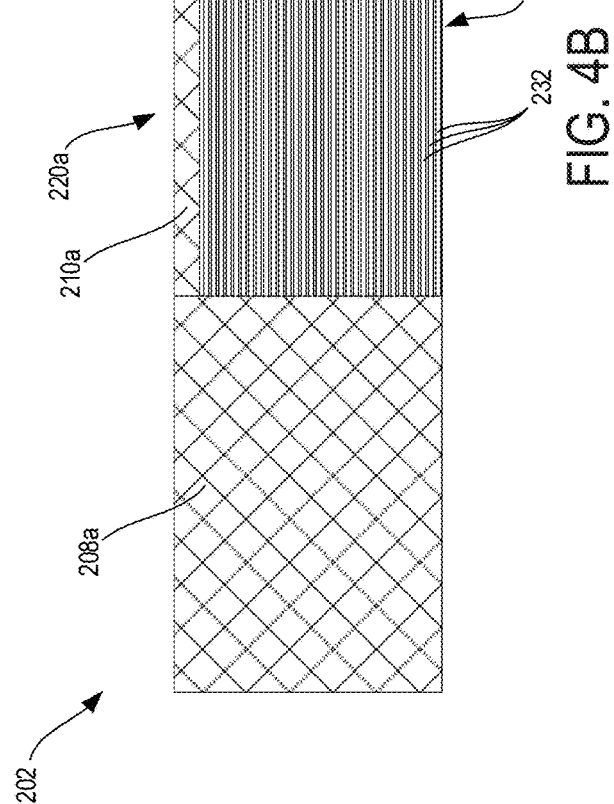

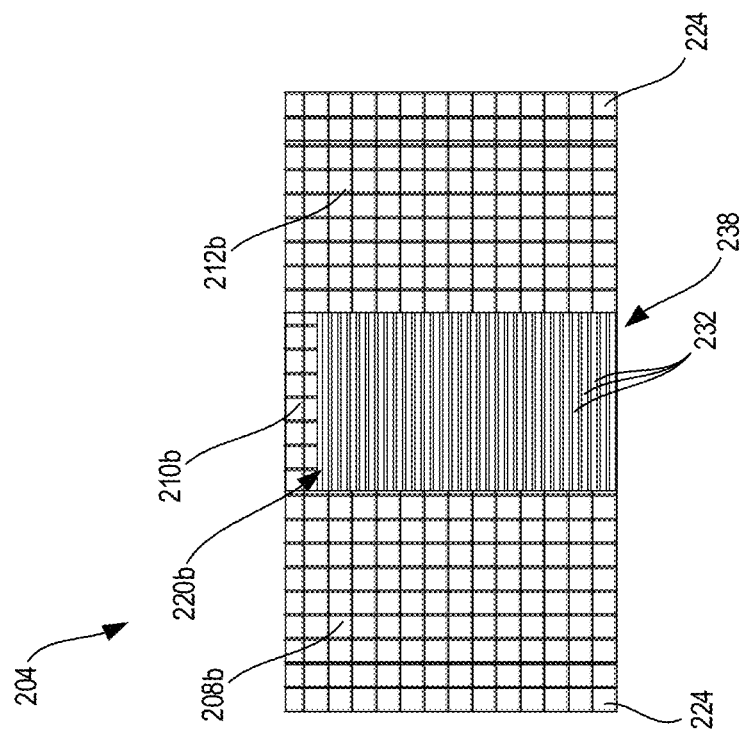
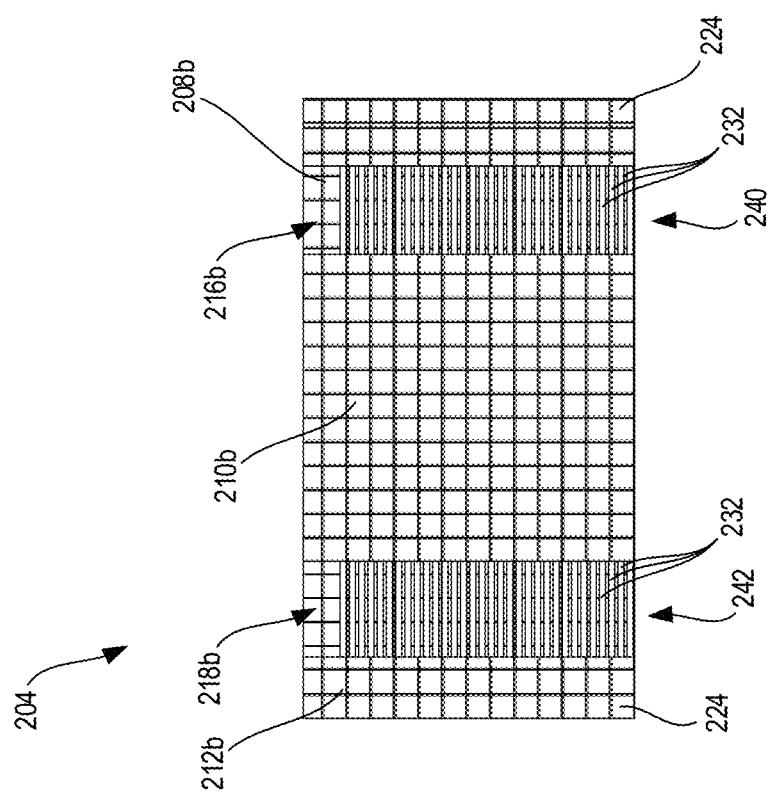

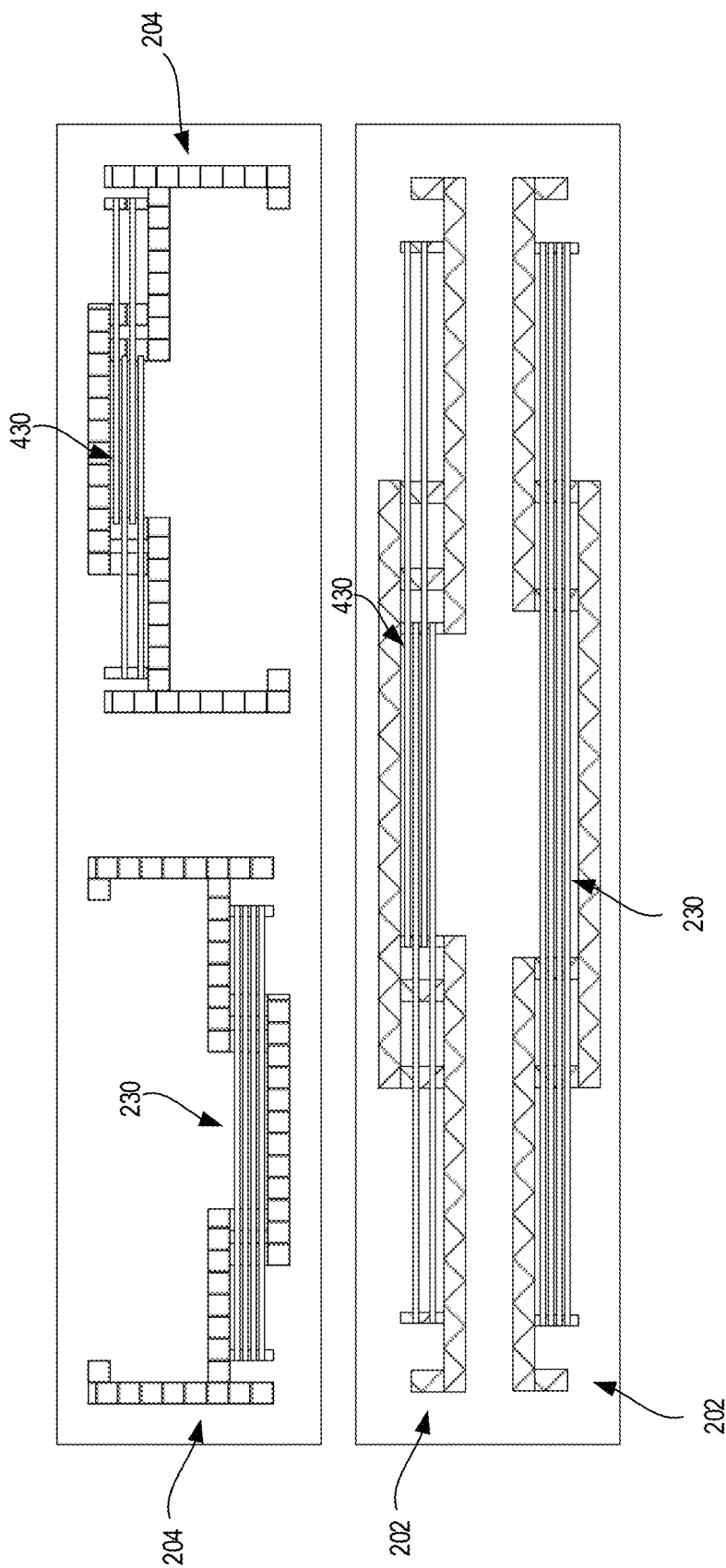

MODULAR THERMAL AND RADIATION SHIELDING WITH PASSIVE HEAT REMOVAL

GOVERNMENT CONTRACT

This invention was made with government support under Contract DE-NE0008853 awarded by the Department of Energy. The government has certain rights in the invention.

BACKGROUND

This invention relates generally to housing assemblies used to transfer heat and protect micro-reactors, and more particularly, to passive thermal heat systems configured to remove heat from the micro-reactors.

SUMMARY

In various embodiments, a housing assembly configured to house a reactor is disclosed. The housing assembly includes a plurality of modular walls and a passive temperature control system. The plurality of modular walls are configured to surround the reactor. The plurality of modular walls include a first modular wall. The passive temperature control system is coupled to the first modular wall. The passive temperature control system is configured to transfer heat between the reactor and an area around the housing assembly.

In various embodiments, a kit for housing a reactor is disclosed. The kit includes a plurality of modular walls, a first passive temperature control system, and a second passive temperature control system. The plurality of modular walls are configured to interconnect and surround the reactor. The plurality of modular walls includes a first modular wall and a second modular wall configured to removably couple to the first modular wall. The first passive temperature control system is coupled to first modular wall. The first passive temperature control system is configured to transfer heat between the reactor and an area surrounding the interconnected modular walls. The second passive temperature control system is coupled to second modular wall. The second passive temperature control system is configured to transfer heat between the reactor and an area surrounding the interconnected modular walls.

In various embodiments, a housing assembly configured to house a reactor is disclosed. The housing assembly includes a modular sidewall assembly, a modular roof assembly, a modular base assembly, and a passive temperature control system coupled to one of the modular sidewall assembly, the modular roof assembly, or the modular base assembly. The modular sidewall assembly includes a plurality of releasably connectable modular sidewalls. The modular sidewall assembly, the modular roof assembly, and the modular base assembly are configured to interconnect and encompass the reactor. The passive temperature control system is configured to transfer heat between the reactor and an area around the housing assembly.

BRIEF DESCRIPTION OF THE DRAWINGS

Various features of the embodiments described herein, together with advantages thereof, may be understood in accordance with the following description taken in conjunction with the accompanying drawings as follows:

FIG. 4A illustrates an outboard view of a modular wall of the housing assembly of FIG. 3, according to at least one aspect of the present disclosure.

FIG. 4B illustrates an inboard view of the modular wall of FIG. 4A, according to at least one aspect of the present disclosure.

FIG. 5A illustrates an outboard view of another modular wall of the housing assembly of FIG. 3, according to at least one aspect of the present disclosure.

FIG. 5B illustrates an inboard view of the modular wall of FIG. 5A, according to at least one aspect of the present disclosure.

FIG. 12 illustrates a kit including a plurality of modular sidewalls of a housing assembly, according to at least one aspect of the present disclosure.

Corresponding reference characters indicate corresponding parts throughout the several views. The exemplifications set out herein illustrate various embodiments of the invention, in one form, and such exemplifications are not to be construed as limiting the scope of the invention in any manner.

DETAILED DESCRIPTION

Figure 1:
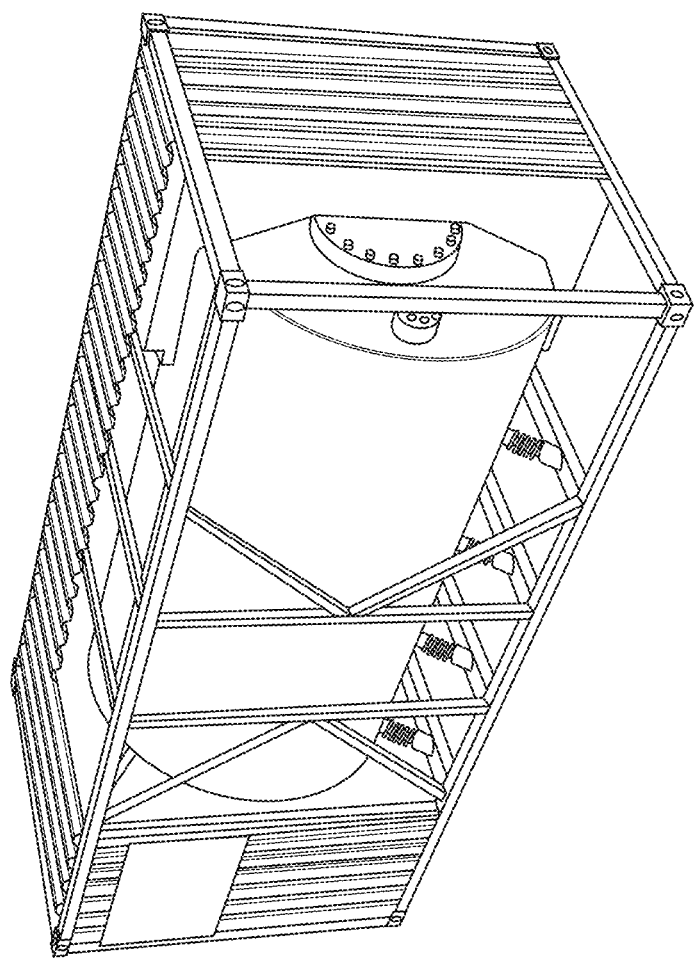
FIG. 1 illustrates a micro-reactor positioned in a shipping container.

Numerous specific details are set forth to provide a thorough understanding of the overall structure, function, manufacture, and use of the embodiments as described in the specification and illustrated in the accompanying drawings. Well-known operations, components, and elements have not been described in detail so as not to obscure the embodiments described in the specification. The reader will understand that the embodiments described and illustrated herein are non-limiting examples, and thus it can be appreciated that the specific structural and functional details disclosed herein may be representative and illustrative. Variations and changes thereto may be made without departing from the scope of the claims.

The electricity energy market can be divided into centralized and decentralized. The centralized market is based on large (in the range of hundreds of MWe) power generators and high capacity dense transmission and distribution networks. The decentralized or off-grid market relies instead on compact power generators (<15 MWe) usually connected to small localized distribution networks or micro-grids. Currently, remote artic communities, remote mines, military bases and island communities are examples of decentralized markets. At present, the energy in off-grid markets is predominately provided by diesel generators. This leads to high costs of electricity, fossil fuel dependency, load restrictions, complicated fuel supply logistics and aging infrastructure. The stringent requirements of off-grid markets include affordability, reliability, flexibility, resiliency, sustainability (clean energy), energy security, and rapid installation and minimum maintenance efforts. All these demands can be addressed with nuclear energy.

Micro-reactors are nuclear reactors that are capable of generating less than 10MWe and capable of being deployed for remote application. These micro-reactors can be packaged in relatively small containers, operate without active involvement of personnel, and operate without refueling/replacement for a longer period than conventional nuclear power plants. One such micro-reactor is the eVinci Micro Reactor system, designed by Westinghouse Electric Company. Other examples of micro-reactors are described in commonly owned U.S. Provisional Application Publication No. 62/984,591, titled "HIGH TEMPERATURE HYDRIDE MODERATOR ENABLING COMPACT AND HIGHER POWER DENSITY CORES IN NUCLEAR MICRO-REACTORS", as well as in U.S. patent application Ser. No. 14/773,405, titled "MOBILE HEAT PIPE COOLED FAST REACTOR SYSTEM, which published as U.S. Patent Application Publication No. 2016/0027536, both of which are hereby incorporated by reference in their entireties herein.

Micro-reactors are designed to enable transport using traditional shipping methods, such as CONEX ISO containers. These designs typically utilize ISO 668 shipping containers, illustrated in FIG. 1.

Micro-reactor decay heat needs to be self-regulating and requires passive decay heat removal systems to ensure "walk-away" safety. Decay heat removal systems can have a significant impact on the overall size and weight of micro-reactor transport packaging.

Figure 2:
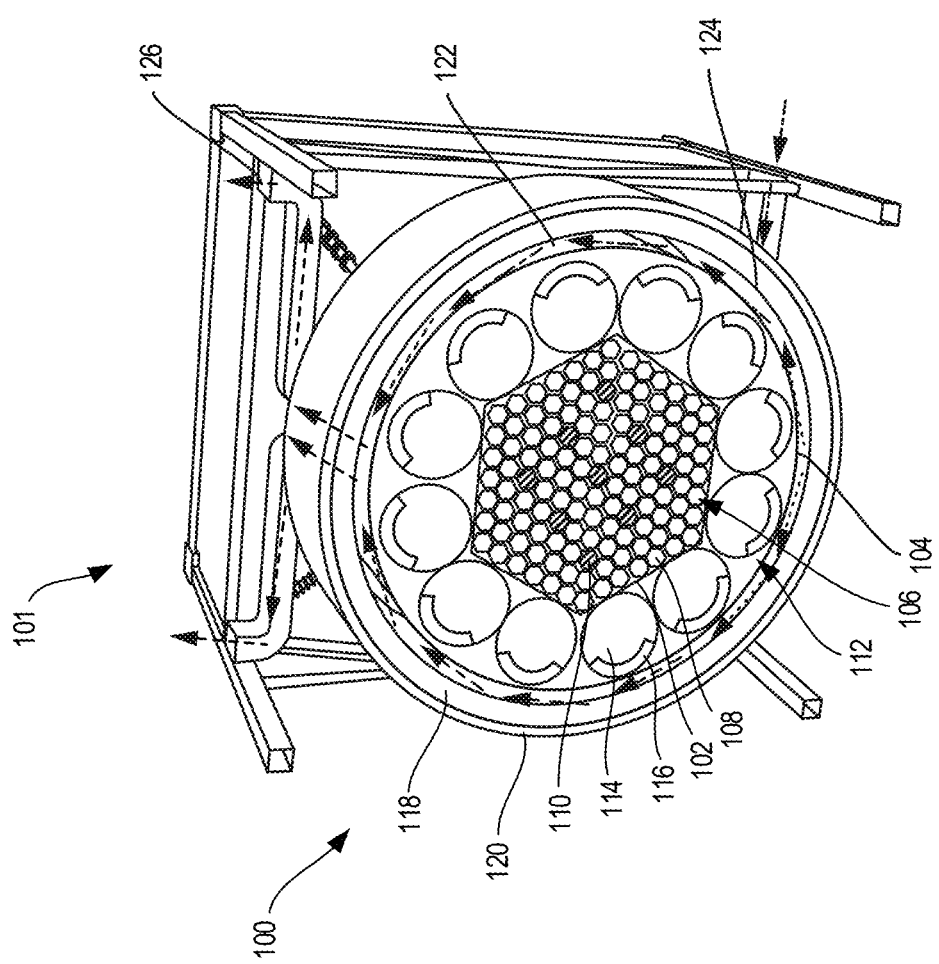
FIG. 2 illustrates a cross-sectional view of a micro-reactor in a shipping container with a conceptual design of a decay heat removal system.

Referring now to FIG. 2, a cross-sectional view of a micro-reactor 100 positioned within a shipping container 101 is illustrated. The micro-reactor 100 includes a monolith core block 102 that is housed within a reactor canister 104. The monolith core block 102 can include a reactor core 106 that includes a plurality of reactor core blocks 108 and a plurality of reactor shutdown modules 110. The monolith core block 102 can be surrounded by a plurality of control drums 112, each of which include a neutron absorber section 114 and a neutron reflector section 116. The above-described monolith core block 102 and reactor core 106 are described in more detail in commonly owned U.S. Provisional Application Publication No. 62/984,591, which is hereby incorporated by reference in its entirety herein.

The micro-reactor 100 can further include neutron shielding 118 and gamma shielding 120 positioned about the reactor canister 104 of the monolith core block 102. An air gap 122 can be defined between the reactor canister 104 and the neutron shielding 118.

Continuing to refer to FIG. 2, a conceptual design of a decay heat removal system is illustrated. Air flow (depicted by segmented arrows) is directed around the periphery of the reactor canister 104 through the air gap 122 through natural convection. This method of decay heat removal system, however, requires a significant geometric footprint. Additionally, the small shipping container 101 requires complex inlets channels, or ducts 124 that direct air flow around the reactor canister 104 and through high chimneys, or outlet ducts 126 to drive sufficient buoyant flow.

Micro-reactor geometric constraints limit space available to install a passive air cooling system utilizing buoyancy driven air flow passages and natural convection, as shown in the conceptual design illustrated in FIG. 2. In addition, the design of an external chimney 126 to promote air flow jeopardizes the safety of the micro-reactor 100 from external threats as it generates a larger target. If damage occurs to the chimneys 126, it could impede the air flow and reduce the effectiveness of cooling. These challenges could put the micro-reactor 100 in a potentially unsafe situation. Operational transients and Design Basis Events (DBEs) require high heat flux, high flow, and large surface areas to remove adequate heat from the micro-reactor, which is not available in the typical configuration shown in FIGS. 1 and 2.

In one aspect, the dynamic response of a self-regulating reactor due to transients or accidents can be dependent on the heat capacity of the system. The passive heat removal system can act to dampen the system thermal response, if designed properly. This can be accomplished without the need for operator action/intervention. In addition to the heat flux capability of the passive heat removal system, additional heat capacity to absorb heat during transients and accidents is required to support self-regulation of a micro-reactor.

Due to the high temperature, high heat flux, and small length scale characteristics of micro-reactors, natural convection as a passive heat removal mode is very limited (on the order of 2,000 W/m$^2$ heat flux). Natural convection can be mainly characterized by Grashof number, which is a direct function of a length scale (to the third power) along with fluid buoyancy and inversely a function of viscosity (to the second power). As the length scale of a microreactor is of a small order and the viscosity of gases typically increase substantially at higher temperature, this leads to relatively low Grashof number (and hence low turbulence level). The resulting heat removal does not support higher power micro-reactors (which can be on the order of 50,000 W/m$^2$ heat flux).

Another passive approach can be to employ evaporative cooling to the micro-reactor via water film applied by a gravity drain tank to the shield or containment structure of the micro-reactor. While this heat removal mode can support the higher power micro-reactor passive heat removal, the space and weight constraints to support a mobile or transportable micro-reactor are prohibitive.

Another passive approach can be to employ thermal radiation cooling to the ambient environment. This mode can support higher power microreactors at high temperatures (on the order of several hundred degrees Celsius). When a mobile micro-reactor is being transported in a shipping container, the single layer of thermal radiation shielding is capable of supporting sufficiently high heat flux through thermal radiation alone (as long as surface emissivity is high).

However, once a transportable micro-reactor is "housed" within an additional structure, such as an arrangement of additional shipping containers for example, the net heat removal is significantly reduced (e.g. on the order of 1/(N+1) of the source heat flux where N is the number thermal radiation shield layers). Completely opening the side walls of the additional shipping containers to mitigate this reduction in heat removal is prohibitive as some shielding functions must be maintained for the microreactor.

Accordingly, there is a need for a system that can increase the amount of heat removal compared to natural convection, which is safe, easy to use, and passive in nature.

Figure 3:
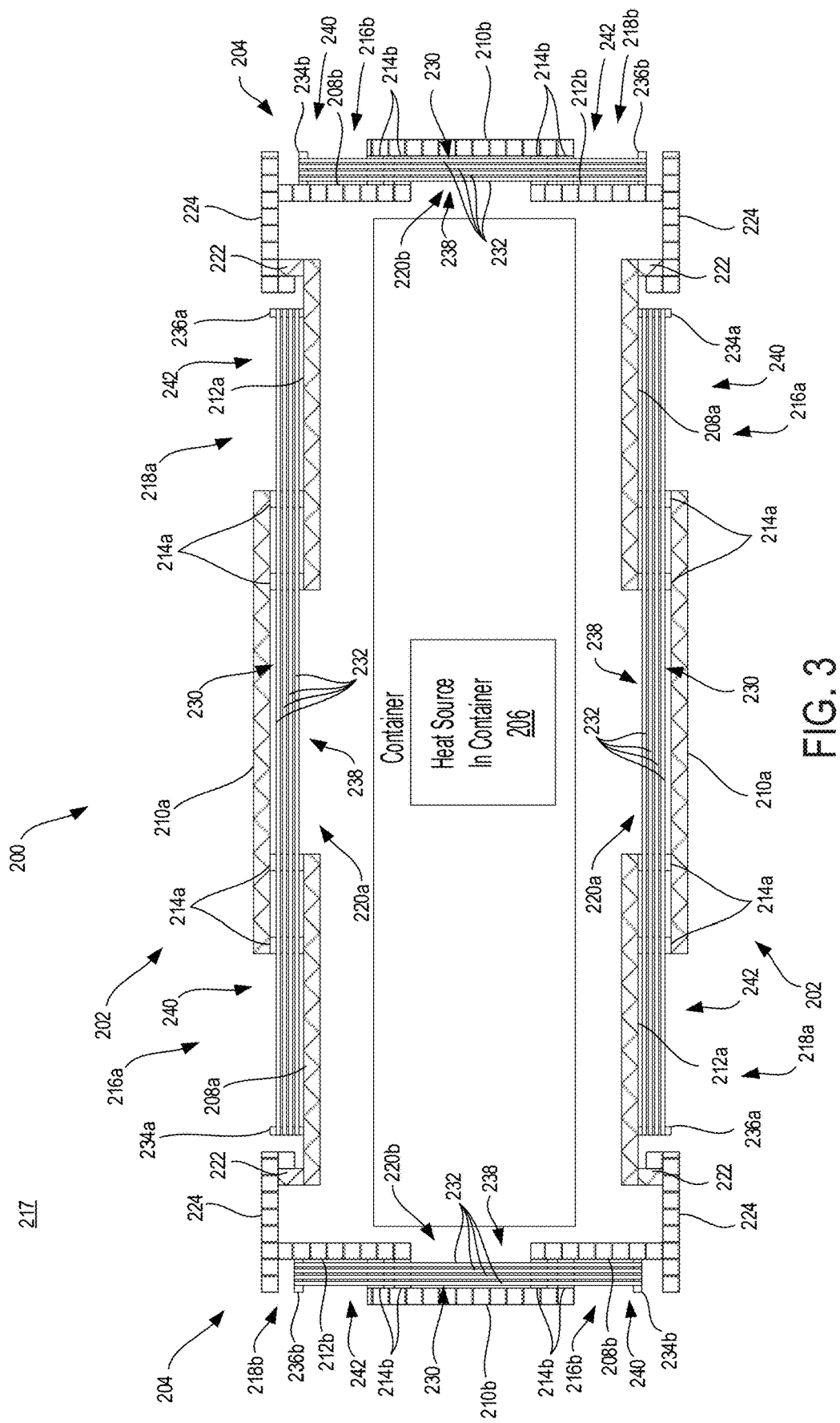
FIG. 3 illustrates a housing assembly configured to house a heat source and passively remove heat therefrom, according to at least one aspect of the present disclosure.

Referring now to FIG. 3, a housing assembly 200 is provided, according to at least one aspect of the present disclosure. In various embodiments, the housing assembly 200 can include a plurality of interconnectable modular walls 202, 204 that can surround any suitable object in which heat is to be removed. In one example embodiment, the plurality of modular walls 202, 204 can interconnect and surround a heat source 206. In some embodiments, the heat source could be a reactor positioned within a shipping container, as is illustrated in FIGS. 1 and 2. In other example embodiments, the plurality of modular walls 202, 204 can interconnect and surround a heat source that is not positioned within a container. While the housing assembly 200 will be shown and described in the context as being used to remove heat from a microreactor, it should be understood that the housing assembly 200 can be utilized to remove heat from any suitable object. In one aspect, the modular walls 202, 204 can be designed to provide both thermal and radioactive shielding from the heat source 206, as well as provide physical separation between the heat source 206 and the ambient environment 217 surrounding the housing assembly 200 when assembled.

In one aspect, the modular walls 202 can be different from the modular walls 204. In one example embodiment, referring to FIG. 3, the modular walls 202 can be larger in length than modular walls 204 such that the housing assembly 200 can define a rectangular shape when assembled, such that the housing assembly 200 can house a rectangular container and heat source. In various embodiments, the modular walls 202, 204 can be identical in size such that the housing assembly 200 can define a square shape. In various embodiments, the modular walls 202, 204 can be any suitable size such that the housing assembly 200 can define any suitable shape to house any type of heat source therein in which heat needs removed. In various embodiments, the modular walls 202, 204 can be curved such that, when the modular walls 202, 204 are interconnected, as will be described in more detail below, the housing assembly 200 can define a circular shape.

In various embodiments, each of the modular walls 202, 204 can be wall assemblies that include a first wall segment 208a, 208b, a second wall segment 210a, 210b, and a third wall segment 212a, 212b, where the second wall segment 210a, 210b is positioned intermediate the first wall segment 208a, 208b and the third wall segment 212a, 212b. The second wall segment 210a, 210b can be coupled to the first wall segment 208a, 208b and the third wall segment 212a, 212b by a plurality of segment couplers 214a, 214b. While each wall segment is shown as being coupled together with two segment couplers, in various other embodiments, more or less than two segment couplers 214a, 214b can be utilized. While each of the modular walls 202, 204 is shown to include three wall segments, in various other embodiments, some or all of the modular walls 202, 204 can include more or less than three wall segments, such as two wall segments, four wall segments, five wall segments, etc. In one aspect, the wall segments can be removably coupled to the segment couplers such that the modular walls can be broken down further into individual wall segments.

In one aspect, each of the modular walls 202, 204 can define a first outboard region 216a, 216b, a second outboard region 218a, 218b, and an inboard region 220a, 220b. The first outboard region 216a, 216b can be defined by an area of the first wall segment 208a, 208b that is exposed to the ambient environment 217 surrounding the housing assembly 200. Similarly, the second outboard region 218a, 218b can be defined by an area of the third wall segment 212a, 212b that is exposed to the ambient environment 217 surrounding the housing assembly 200. In addition, the inboard region 220a, 220b can be defined by an area of the second wall segment 210a, 210b that is exposed and has a direct view factor to the heat source 206 within the housing assembly 200. In various embodiments, the first outboard region 216a, 216b and second outboard region 218a, 218b can be substantially similar in size. In various other embodiments, the first outboard region 216a, 216b and second outboard region 218a, 218b can be different in size. In one aspect, the first outboard region 216a, 216b and second outboard region 218a, 218b can be defined based on the positioning of the second wall segment 210a, 210b relative to the first wall segment 208a, 208b and the third wall segment 212a, 212b.

As referenced above, the modular walls 202, 204 can interconnect so as to surround the heat source 206. In various embodiments, the modular walls 202 can include first wall couplers 222 extending from the first wall segments 208a and the third wall segments 212a. In addition, the modular walls 204 can include second wall couplers 224 extending from the first wall segments 208b and the third wall segments 212b. In one aspect, the second wall couplers 224 can engage the first wall couplers 222 so as to interlock the modular walls 202, 204, as well as aid in assembly of the housing assembly 200. In various embodiments, the wall couplers 222, 224 can include aligning surfaces so as to properly align the modular walls 202, 204 together when assembling the housing assembly 200. In various embodiments, the wall couplers 222, 224 can utilize a positive connection between the modular walls 202, 204 (e.g. pin alignments, nesting blocks, snap features, latch features, etc.) to allow the modular walls 202, 204 to interconnect and form the housing assembly 200. It should be understood that the wall couplers 222, 224 allow the modular walls to interconnector and maintain the shape of the housing assembly 200, but also allow the modular walls 202, 204 to be disassembled into the individual modular walls 202, 204. In various embodiments, the wall couplers 224 can comprise flexible coupler arms that can flex and capture the wall couplers 222 to hold the modular walls 204 to modular walls 202.

In various embodiments, each of the modular walls 202, 204 can include a passive temperature control system 230 removably coupled thereto. The passive temperature control systems 230 can transfer heat between the heat source 206 and the ambient environment 217 surrounding the housing assembly 200, as will be described in more detail below. In some embodiments, only a select number of the modular walls 202, 204 can include a passive temperature control system 230. In one aspect, the passive temperature control systems 230 can be independent components from the modular walls 202, 204 and the heat source 206 such that one passive temperature control system can be removed and replaced with a different passive temperature control system 230. In various embodiments, the passive temperature control system 230 can be embedded within the modular walls 202, 204 such that the shielding material of the modular walls 202, 204 can act as surface area for the collection/distribution of heat as well as providing thermal, radioactive, and protective barriers to the passive temperature control system 230. In various embodiments, the modular walls 202, 204 can include more than one passive temperature control system 230, such as two or more separate and distinct passive temperature control systems. In various embodiments, as will be described elsewhere herein, each wall segment of the modular walls can include its own passive temperature control system.

In one aspect, the passive temperature control system 230 can comprise a plurality of heat pipes 232. A heat pipe is a hermetically sealed, two-phase heat transfer component used to transfer heat from a primary location thereof (evaporator section) to at least one secondary location thereof (condenser section). The heat pipes further include a working fluid (such as water, liquid potassium, sodium, alkali metal, methane, etc.) and a wick disposed therein. In operation, the working fluid can absorb heat in the evaporator section and vaporize. The saturated vapor, carrying latent heat of vaporization, flows towards the condenser sections through an adiabatic section of the heat pipe. In the condenser sections, the vapor condenses into a liquid pool and gives off its latent heat. The condensed liquid is then returned to the evaporator section through the wick by capillary action. The phase change processes and two-phase flow circulation continues as long as the temperature gradient between the evaporator and condenser sections is maintained. Due to the very high heat transfer coefficients for boiling and condensation, heat pipes are highly effective thermal conductors. Example heat pipes in nuclear applications are described in U.S. Pat. Nos. 5,684,848, 6,768,781, and U.S. Patent Application Publication No. 2016/0027536, U.S. patent application Ser. No. 16/853,270, U.S. patent application Ser. No. 16/853,345, and U.S. Provisional Patent Application No. 63/012,725, all of which are hereby incorporated by reference in their entireties herein.

In one aspect, each of the heat pipes 232 can extend from a first location on the modular wall 202, 204 to a second location on the modular wall 202, 204. In one example embodiment, referring to FIG. 3, each of the plurality of heat pipes 232 can be coupled to the modular walls 202, 204 such that each of the heat pipes 232 extends from the first outboard region 216a, 216b, through the segment couplers 214a, 214b and the inboard region 220a, 220b, to the second outboard region 218a, 218b. Each of the first ends of the plurality of heat pipes 232 can be coupled to the first wall segment 208a, 208b at a first attachment pin 234a, 234b and the second end of the plurality of heat pipes can be coupled to the second wall segment 212a, 212b at a second attachment pin 236a, 236b.

In one aspect, each of the heat pipes 232 can include a central evaporator section 238 positioned in the inboard regions 220a, 220b, a first condenser section 240 at the first outboard regions 216a, 216b, and a second condenser section 242 at the second outboard regions 218a, 218b of the modular walls 202, 204. In one aspect, the central evaporator sections 238 can be in the planes of the heat source 206 and have a direct view factor to the heat source 206. In operation, heat emitted from the heat source 206 can be absorbed by the working fluid at the evaporator sections 238 of the heat pipes 232 and evaporate. The saturated vapor, carrying latent heat of vaporization, can flow to one of the first or second condenser sections 240, 242 of the heat pipes 232 at the first outboard region 216a, 216b or the second outboard region 218a, 218b, respectively, of the modular walls 202, 204. In the condenser sections 240, 242, the vapor can condense into a liquid pool and gives off its latent heat to the ambient environment 217 surrounding the housing assembly 200. The condensed liquid in the heat pipes can return to the evaporator section 238 through the wick of the heat pipes 232 by capillary action. The phase change process and two-phase flow circulation can continue as long as a temperature gradient between the evaporator section 238 (based on the temperature of the heat source 206 in housing assembly 200) and condenser sections 240, 242 (based on the temperature of the ambient environment 217 surrounding the housing assembly 200) is maintained.

The design of the heat pipes 232 can utilize a variety of wicking surfaces (grooved, rifled, extruded, screened, etc.). As referenced above, the evaporator sections 238 of heat pipes 232 can have a direct view factor to the heat source 206, which can increase the heat pipes 232 ability to transfer heat from the heat source 206 within the housing assembly 200 to the ambient environment 217 surrounding the housing assembly 200. In one aspect, the heat pipes 232 can function as a motive means for heat removal from the housing assembly 200, which can be integral to modular walls 202, 204 that provide a thermal and radioactive barrier from the heat source 206 within. Depending on the cooling demand of the system, which is driven by natural convection, grooving, rifling, extruding, or installing wicks in the evaporator section 238 of the heat pipes 232, can be utilized to meet the cooling demand. Additionally, to improve upon the limited amount of heat transfer that would occur with natural convection alone, the view factor and surface areas of both the evaporator section 238 and condenser sections 240, 242 of the heat pipes 232 can be maximized to drastically increase the amount of heat flux through radiative heat transfer. In various embodiments, this can be accomplished by embedding the heat pipes 232 in the modular walls 202, 204 themselves, by using an independent collection/distribution plate that is mechanical coupled to the heat pipes 232, etc.

The above-provided housing assembly 200 provides a passive temperature control system 230 that provides the ability to transfer large amounts of heat without the need to be mechanical coupled to the source from which heat is being transferred from (i.e., the heat source 206). This is accomplished through the use of radiative heat transfer opposed to forced flow to promote the transfer of heat. The system, being passive in nature, will not require active components, can increase the reliability, and minimize maintenance. The continuous availability of the system improves the self-regulating aspects of a micro-reactor design.

Figure 6A:
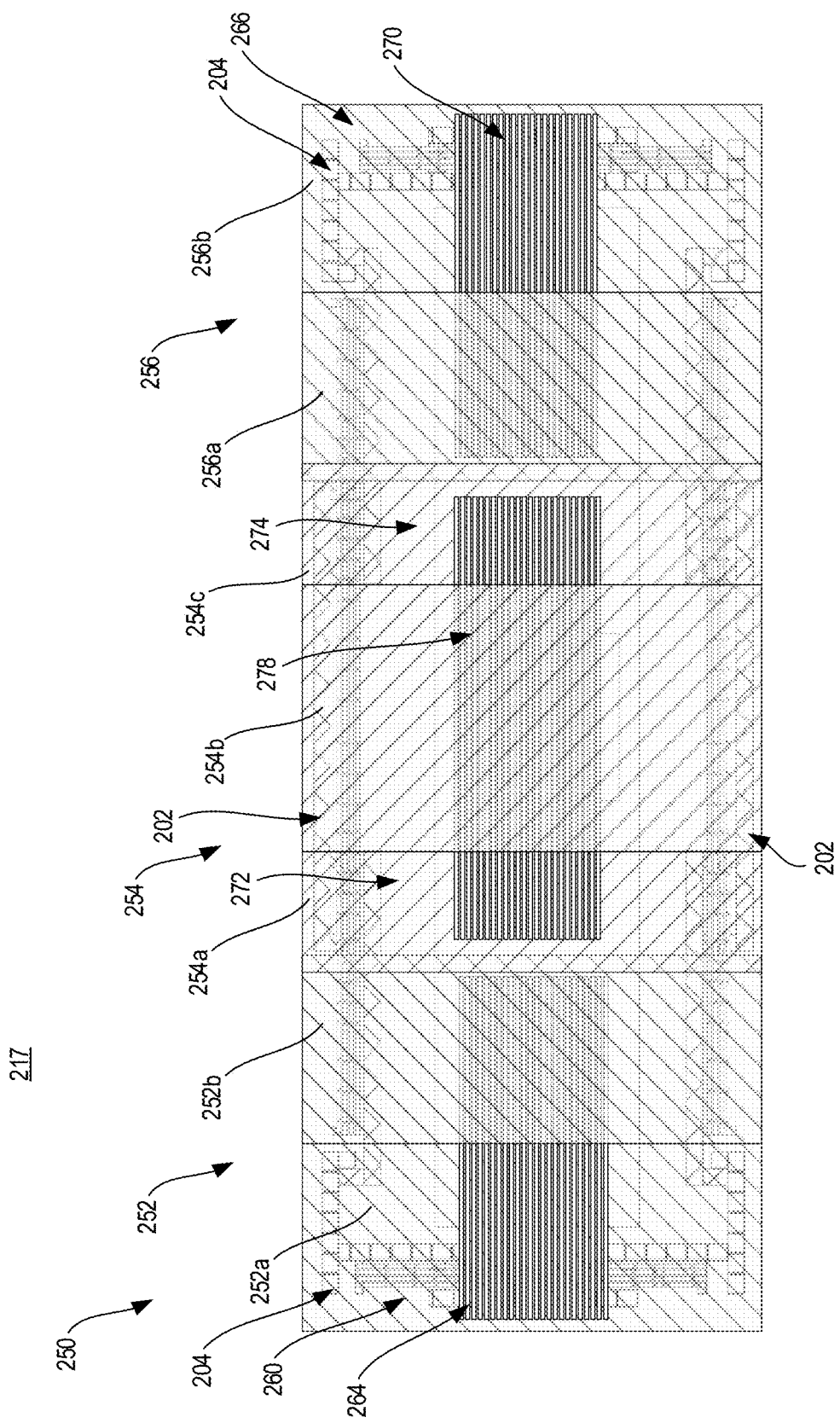
FIG. 6A illustrates a modular roof assembly coupled to the housing assembly of FIG. 3, according to at least one aspect of the present disclosure.
Figure 6B:
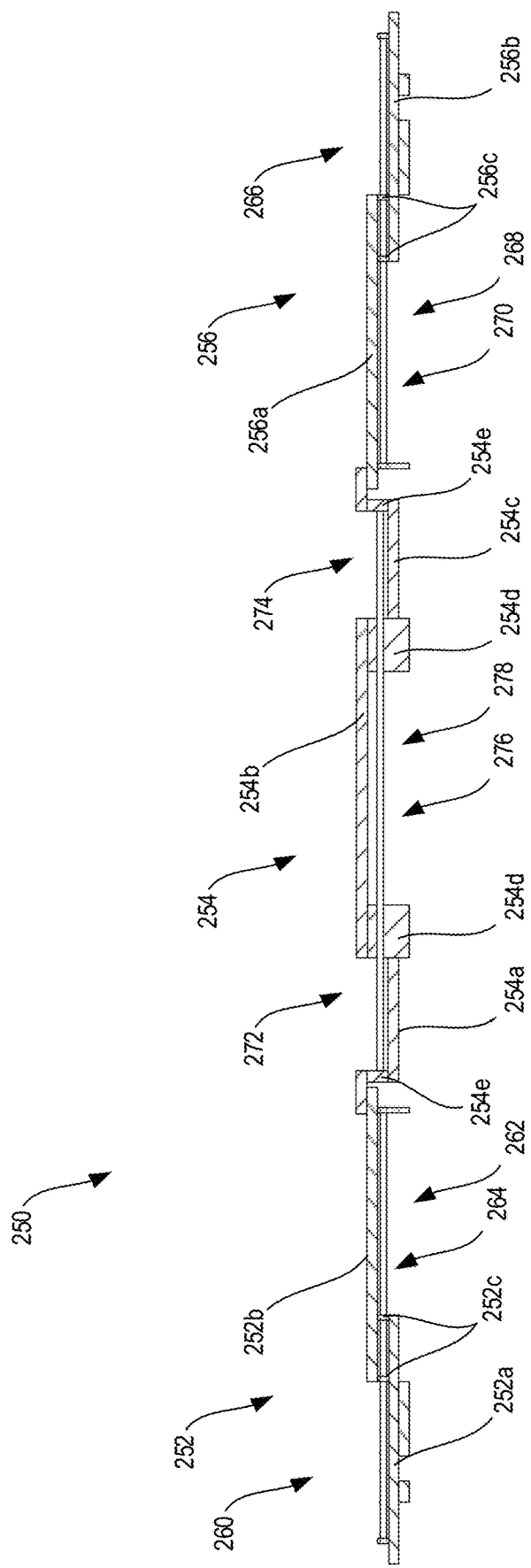
FIG. 6B illustrates a side view of the modular roof assembly of FIG. 6A, according to at least one aspect of the present disclosure.

While four modular walls 202, 204 are shown and described, it should be understood that any number and combination of modular walls and wall segments can be utilized to surround and completely encapsulate the heat source 206. For example, referring now to FIGS. 6A and 6B, a modular roof assembly 250 is provided, according to at least one aspect of the present disclosure. In one aspect, the modular roof assembly 250 can be substantially similar to the modular walls 202, 204. In one aspect, the modular roof assembly 250 can be used with the modular walls 202, 204 to further encapsulate the heat source 206 within the housing assembly 200. In one aspect, as is shown in FIGS. 6A and 6B, the modular roof assembly 250 can be removably coupled to modular walls 202, 204 to further encapsulate the heat source 206 within the housing assembly 200. In various embodiments, a modular base assembly can be provided that is substantially similar to modular roof assembly 250, which can couple to the modular walls 202, 204 on an opposite side of the housing assembly 200 from the modular roof assembly 250. In one aspect, the modular walls 202, 204, the modular roof assembly 250, and the modular base assembly can collectively define the housing assembly 200 to encompass the heat source 206 therein.

In one aspect, the modular roof assembly 250 and the modular base assembly can each include wall couplers to releasably couple the modular roof assembly 250 and the modular base assembly to the modular walls 202, 204. In one aspect, the wall couplers can be similar to wall couplers 222, 224, as well as other wall couplers, described elsewhere herein. In various other embodiments, the wall couplers can be any suitable coupler that can releasably couple the modular roof assembly 250 and the modular base assembly to the modular walls 202, 204.

In various embodiments, the modular roof assembly 250 can include a first wall segment assembly 252, a second wall segment assembly 254, and a third wall segment assembly 256, where the second wall segment assembly 254 is positioned intermediate the first wall segment assembly 252 and the third wall segment assembly 256.

In one aspect, the first wall segment assembly 252 can include a first wall segment 252a and a second wall segment 252b coupled to the first wall segment 252a by a plurality of segment couplers 252c. The first wall segment 252a can define an outboard region 260 exposed to the ambient environment 217 surrounding the housing assembly 200 and the second wall segment 252b can define an inboard region 262 exposed to the heat source within the housing assembly 200. In various embodiments, the first wall segment assembly 252 can include a passive temperature control system 264 that can extend from the outboard region 260 to the inboard region 262 and can function to transfer heat between the heat source 206 within the housing assembly 200 and the ambient environment 217 surrounding the housing assembly 200. In one aspect, the passive temperature control system 264 can be similar to other passive temperature control systems described herein, such as passive temperature control system 230.

Similar to the first wall segment assembly 252, in one aspect, the third wall segment assembly 256 can include a first wall segment 256a and a second wall segment 256b coupled to the first wall segment 256a by a plurality of segment couplers 256c. The first wall segment 256a can define an outboard region 266 exposed to the ambient environment 217 surrounding the housing assembly 200 and the second wall segment 256b can define an inboard region 268 exposed to the heat source 206 within the housing assembly 200. In various embodiments, the third wall segment assembly 256 can include a passive temperature control system 270 that can extend from the outboard region 266 to the inboard region 268 and can function to transfer heat between the heat source 206 within the housing assembly 200 and the ambient environment 217 surrounding the housing assembly 200. In one aspect, the passive temperature control system 270 can be similar to other passive temperature control systems described herein, such as passive temperature control systems 230, 264.

In various embodiments, the second wall segment assembly 254 can include a first wall segment 254a, a second wall segment 254b, and a third wall segment 254c, wherein the second wall segment 254b is positioned intermediate the first wall segment 254a and the third wall segment 254c. In one aspect, the first wall segment 254a and the third wall segment 254c can be coupled to the second wall segment 254b by a plurality of segment couplers 254d. In various embodiments, the first wall segment assembly 252 and the third wall segment assembly 256 can be coupled to the second wall segment assembly 254 by a plurality of segment couplers 254e. The first wall segment 254a and the third wall segment 254c can define a first outboard region 272 and second outboard region 274, respectively, exposed to the ambient environment 217 surrounding the housing assembly 200 and the second wall segment 254b can define an inboard region 276 exposed to the heat source 206 within the housing assembly 200. In various embodiments, the second wall segment assembly 254 can include a passive temperature control system 278 that can extend from the first outboard region 272, through the inboard region 276, and to the second outboard region 274, and can function to transfer heat between the heat source 206 within the housing assembly 200 and the ambient environment 217 surrounding the housing assembly 200. In one aspect, the passive temperature control system 278 can be similar to other passive temperature control systems described herein, such as the passive temperature control systems 230, 264, 270.

As described above, each of the first, second, and third wall segment assemblies 252, 254, 256 of the modular roof assembly 250 can include their own independent passive temperature control system 264, 270, 278. The use of multiple passive temperature controls systems in each of the wall segment assemblies can increase the systems ability to transfer heat between the heat source 206 and the ambient environment 217. For example, the modular roof assembly 250 can include four outboard regions 260, 266, 272, 274, thus, providing four separate and distinct locations in which heat can be dispersed into the ambient environment 217 surrounding the housing assembly 200. While three segment assemblies with four outboard regions are shown and described, in various other embodiments, the modular roof assembly can include more or less than three segment assemblies and more or less than four outboard regions. In one aspect, the passive temperature control systems 264, 270, 278 of the modular roof assembly 250 can be similar to other passive temperature control systems described elsewhere herein, such as passive temperature control system 230. In various embodiments, the modular base assembly can be substantially similar to the modular roof assembly 250 and modular walls 202, 204. In various other embodiments, the modular base assembly may not include one or more passive temperature control system in embodiments where the modular base assembly is not exposed to the ambient environment 217.

Figure 7:
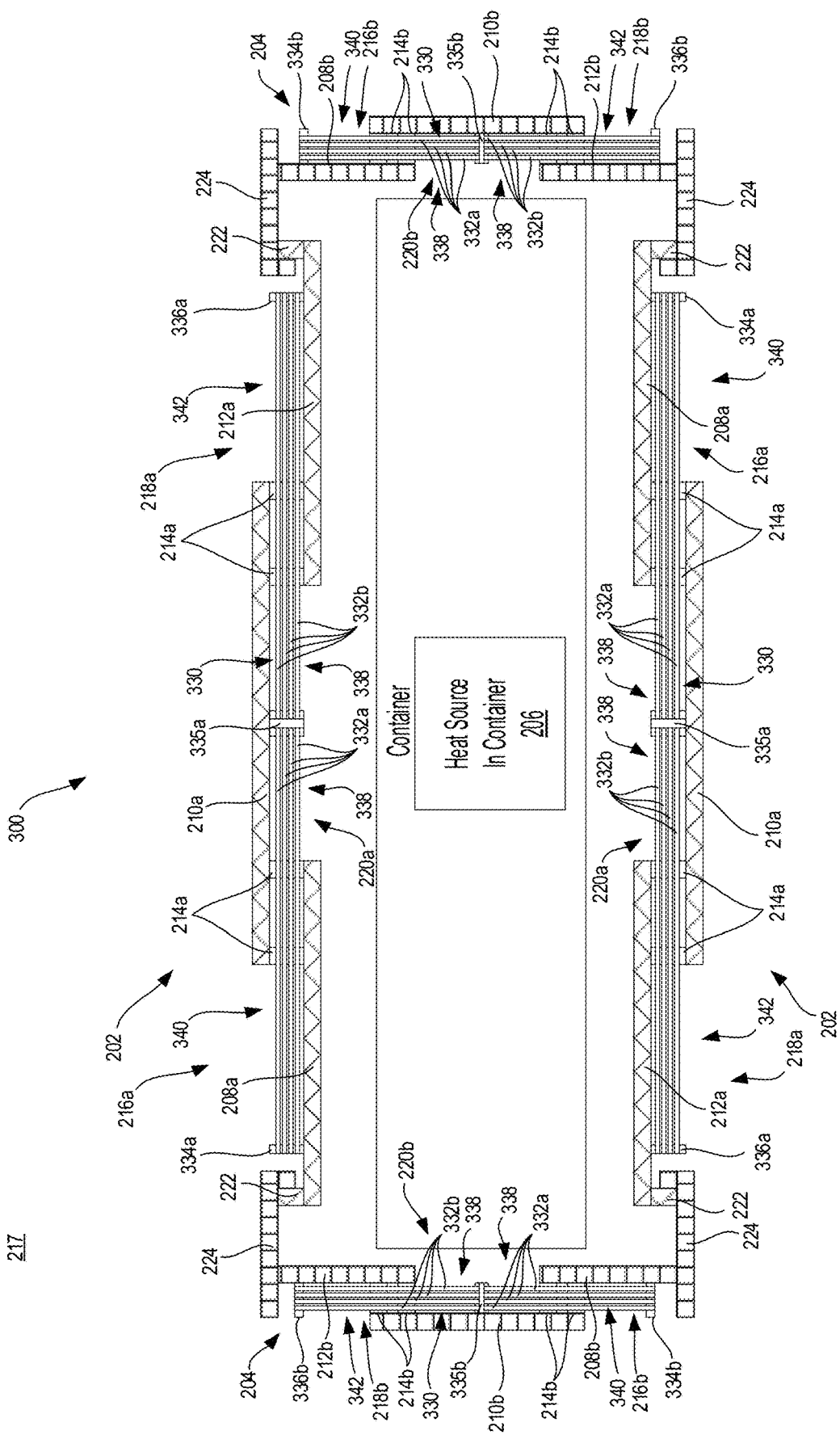
FIG. 7 illustrates another housing assembly configured to house a heat source and passively remove heat therefrom, according to at least one aspect of the present disclosure.

Referring now to FIG. 7, another housing assembly 300 is provided, according to at least one aspect of the present disclosure. In various embodiments, the housing assembly 300 can be substantially similar to housing assembly 200 (similar reference numbers will be utilized in the Figures to illustrate their similarities) except for the differences noted herein below.

Similar to housing assembly 200, each of the modular walls 202, 204 can include a passive temperature control system 330 that comprises a plurality of heat pipes 332a, 332b. The plurality of heat pipes 332a, 332b can include a first grouping of heat pipes 332a and a second grouping of heat pipes 332b. As shown in FIG. 7, the first grouping of heat pipes 332a can be coupled to a first pin 334a, 334b of the first wall segment 208a, 208b, extend from the first outboard region 216a, 216b to the inboard region 220a, 220b, and couple to a first side of a common pin 335a, 335b of the second wall segment 210a, 210b. Similarly, the second grouping of heat pipes 332b can be coupled to a second pin 336a, 336b of the third wall segment 212a, 212b, extend from the second outboard region 218a, 218b to the inboard region 220a, 220b, and couple to a second side of the common pin 335a, 335b of the second wall segment 210a, 210b.

In one aspect, each of the heat pipes from the first grouping of heat pipes 332a and the second grouping of heat pipes 332b includes a single evaporator section 338 and a single condenser section 340, 342. In one aspect, the first grouping of heat pipes 332a are coupled to the first side of the common pin 335a, 335b and the second grouping of heat pipes 332b are coupled to the second side of the common pin 335a, 335b such that the evaporator sections 338 of the heat pipes 332a, 332b do not overlap. Stated another way, the first grouping of heat pipes 332a are coupled to the common pin 335a, 335b at a location that is closer to the first outboard region 216a, 216b than the second outboard region 218a, 218b. Similarly, the second grouping of heat pipes 332b are coupled to the common pin 335a, 335b at a location that is closer to the second outboard region 218a, 218b than the first outboard region 216a, 216b.

In operation, heat emitted from the heat source 206 can be absorbed by the working fluid at the evaporator sections 338 of the first and second grouping of heat pipes 332a, 332b and evaporate. The saturated vapor, carrying latent heat of vaporization, can flow to the respective condenser sections 340, 342 of the heat pipes 332a, 332b at the first outboard region 216a, 216b or the second outboard region 218a, 218b of the modular walls 202, 204. In the condenser sections 340, 342, the vapor can condense into a liquid pool and gives off its latent heat to the ambient environment 217 surrounding the housing assembly 300. The condensed liquid in the heat pipes 332a, 332b can return to the evaporator sections 338 through the wick of the heat pipes 332a, 332b by capillary action. The phase change process and two-phase flow circulation can continues as long as a temperature gradient between the evaporator sections 338 (based on the temperature of the heat source 206 in housing assembly 300) and condenser sections 340, 342 (based on the temperature of the ambient environment 217 surrounding of the housing assembly 300) is maintained.

The use of independent heat pipes 332a, 332b allows for easier maintenance to the modular walls 202, 204 should one of the heat pipes 332a, 332b need replaced. For example, heat pipes 332a can be replaced while heat pipes 332b are left in service, which can help maintain the thermal output of the system. In addition, should one heat pipe 332a stop functioning properly, only one side of the modular wall 202, 204 will potentially experience a reduction in thermal performance. In addition, in various embodiments, the above-provided configuration allows for more heat pipes to be used on one side of the modular walls 202, 204 than another side of the modular walls 204.

Figure 8:
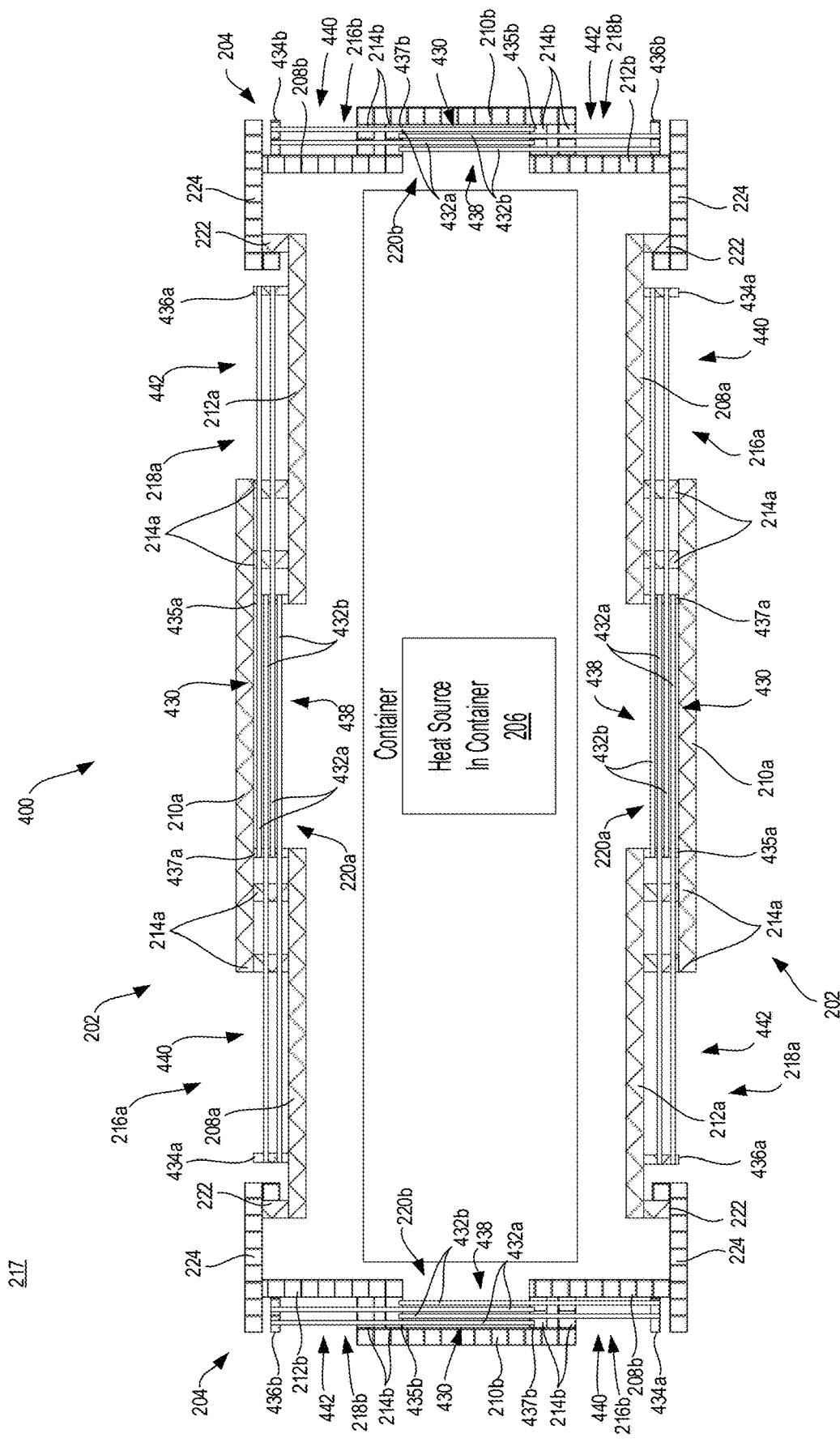
FIG. 8 illustrates another housing assembly configured to house a heat source and passively remove heat therefrom, according to at least one aspect of the present disclosure.

Referring now to FIG. 8, another housing assembly 400 is provided, according to at least one aspect of the present disclosure. In various embodiments, the housing assembly 400 can be substantially similar to housing assemblies 200, 300 (similar reference numbers will be utilized in the Figures to illustrate their similarities) except for the differences noted herein below.

Similar to housing assemblies 200, 300, each of the modular walls 202, 204 can include a passive temperature control system 430 that comprises a plurality of heat pipes 432a, 432b. The plurality of heat pipes 432a, 432b can include a first grouping of heat pipes 432a and a second grouping of heat pipes 432b. As shown in FIG. 8, the first grouping of heat pipes 432a can be coupled to a first pin 434a, 434b of the first wall segment 208a, 208b, extend from the first outboard region 216a, 216b to the inboard region 220a, 220b, and couple to a second pin 435a, 435b of the second wall segment 210a, 210b. Similarly, the second grouping of heat pipes 432b can be coupled to a third pin 436a, 436b of the third wall segment 212a, 212b, extend from the second outboard region 218a, 218b to the inboard region 220a, 220b, and couple to a fourth pin 437a, 437b of the second wall segment 210a, 210b.

Similar to the heat pipes 332a, 332b of the housing assembly 300, each of the heat pipes from the first grouping of heat pipes 432a and the second grouping of heat pipes 432b can include a single evaporator section 438 and a single condenser section 440, 442. In one aspect, the first grouping of heat pipes 432a are coupled to the second pin 435a, 435b and the second grouping of heat pipes 432b are coupled to the fourth pin 437a, 437b such that the evaporator sections 438 of the heat pipes 432a, 432b overlap. Stated another way, the first grouping of heat pipes 432a are coupled to the second pin 435a, 435b at a location that is closer to the second outboard region 218a, 218b than the first outboard region 216a, 216b. Similarly, the second grouping of heat pipes 432b are coupled to the fourth pin 437a, 437b at a location that is closer to the first outboard region 216a, 216b that the second outboard region 218a, 218b.

In operation, heat emitted from the heat source 206 can be absorbed by the working fluid at the evaporator sections 438 of the first and second grouping of heat pipes 432a, 432b and evaporate. The saturated vapor, carrying latent heat of vaporization, can flow to the respective condenser sections 440, 442 of the heat pipes 432a, 432b at the first outboard region 216a, 216b or the second outboard region 218a, 218b of the modular walls 202, 204. In the condenser sections 440, 442, the vapor can condense into a liquid pool and gives off its latent heat to the ambient environment 217 surrounding the housing assembly 400. The condensed liquid in the heat pipes 432a, 432b can return to the evaporator sections 438 through the wick of the heat pipes 432a, 432b by capillary action. The phase change process and two-phase flow circulation can continues as long as a temperature gradient between the evaporator sections 438 (based on the temperature of the heat source 206 in housing assembly 400) and condenser sections 440, 442 (based on the temperature of the ambient environment 217 surrounding of the housing assembly 400) is maintained.

The use of independent heat pipes 432a, 432b allows for easier maintenance to the modular walls 202, 204 should one of the heat pipes 432a, 432b need replaced. For example, heat pipes 432a can be replaced while heat pipes 432b are left in service, which can help maintain the thermal output of the system. In addition, should one heat pipe 432a stop functioning properly, only one side of the modular wall 202, 204 will potentially experience a reduction in thermal performance. In addition, in various embodiments, the above-provided configuration allows for more heat pipes to be used on one side of the modular walls 202, 204 than another side of the modular walls 204. In addition, the use of overlapping evaporator sections 438 can increase the thermal performance of the passive temperature control system 430 by increasing the amount of surface area that the evaporator sections 438 of the heats pipes 432a, 432b can cover in the inboard regions 220a, 220b. In one aspect, the heat pipes 432a can be coupled to the second pin 435a, 435b such that the evaporator sections 438 span the entire length of the inboard regions 220a, 220b. Similarly, the heat pipes 432b can be coupled to the fourth pin 437a, 437b such that the evaporator sections 438 span the entire length of the inboard regions 220a, 220b Referring now to FIG. 9, a loop thermosiphon system 500 is provided, according to at least one aspect of the present disclosure. In one aspect, the loop thermosiphon system 500 can have similar features to the loop thermosiphon described in U.S. Provisional Patent Application No. 63/018,539, which is hereby incorporated by reference in its entirety herein.

In various embodiments, the loop thermosiphon system 500 can be a closed-loop system, and can include an evaporator section 502, a first condenser section 504 fluidically coupled to the evaporator section 502, and a second condenser section 506 fluidically coupled to the evaporator section 502. The loop thermosiphon system 500 can further include a working fluid or medium (such as water, liquid potassium, sodium, alkali metal, methane, etc.) that can transport decay heat from the evaporation section 502 to the condenser sections 504, 506. Similar to heat pipes, in operation, heat emitted from a heat source can be absorbed by the working fluid at the evaporator section 502 of the loop thermosiphon system 500. The saturated vapor, carrying latent heat of vaporization, can flow to the condenser sections 504, 506 via upper flow paths 508, 510. In the condenser sections 504, 506, the vapor can condense into a liquid pool and gives off its latent heat to the ambient environment. The condensed liquid in the condenser sections 504, 506 can then return to the evaporator section 502 via the lower flow paths 512, 514. In one aspect, the lower flow paths 512, 514 can include wicks to transport heat from the condenser sections 504, 506 back to the evaporator section 502. The phase change process and two-phase flow circulation can continues as long as a temperature gradient between the evaporator section 502 and condenser sections 504, 506 is maintained. Similar to heat pipes, the loop thermosiphon system 500 can be passive in nature. In various embodiments, the loop thermosiphon system 500 can provided substantially similar benefits as those of the heat pipes, described elsewhere herein.

Figure 9:
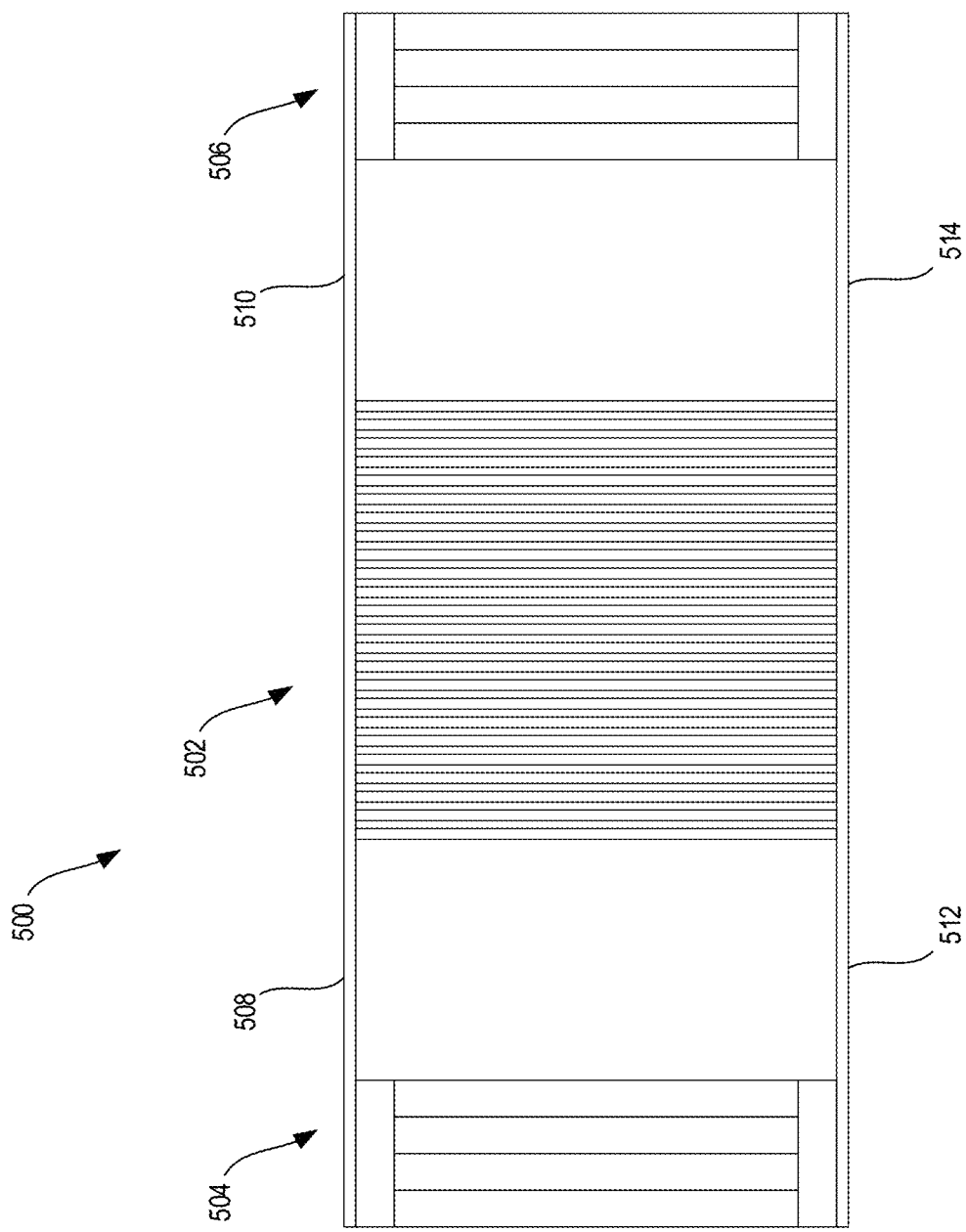
FIG. 9 illustrates a loop thermosiphon system usable with a housing assembly to passively remove heat from a heat source, according to at least one aspect of the present disclosure.

In various embodiments, the housing assemblies 200, 300, 400 can include the loop thermosiphon system 500 in alternative, or in addition to, the heat pipes. Stated another way, the passive temperature control systems disclosed elsewhere herein can comprise the loop thermosiphon system 500. In one aspect, the evaporator section 502 of the loop thermosiphon system 500 can be positioned at the inboard region of the housing assembly, the first condenser section 504 can be positioned in the first outboard region of the housing assembly, and the second condenser section 506 can be positioned in the second outboard region of the housing assembly. The loop thermosiphon system 500 can function in a substantially similar manner to the heat pipes, in that heat can be absorbed by the evaporator section 502 in the inboard region, and the vaporized working fluid can travel to the condenser sections 504, 506 (via upper flow paths 508, 510) to release latent heat the ambient environment 217. In one aspect, the loop thermosiphon system 500 configuration can require that a specific orientation (a vertical orientation) is established to properly function (such that the evaporated vapor in the evaporator sections 502 can flow upward through upper flow paths 508, 510). In various embodiments, the evaporator section 502 can be routed vertically towards the condenser sections 504, 506, as is shown in FIG. 9.

In one aspect, heat transfer between the condenser sections 504, 506 and the ambient environment 217 can be increased. In various embodiments, the surface area of the condenser sections 504, 506 can be increased to increase the heat transfer between the ambient environment 217 and the condenser sections 504, 506. In various embodiments, the condenser sections 504, 506 can include finned heat exchangers that can increase the amount of heat passed from the condenser sections 504, 506 to the ambient environment 217. In various other embodiments, to improve the efficacy of the design, motive means of passing air over the condenser sections 504, 506 or misting evaporation can be utilized to increase heat removal from the system.

While the loop thermosiphon system 500 illustrates a single evaporator section 502 and two condenser sections 504, 506, various other loop thermosiphon systems 500 are envisioned by the present disclosure. In one embodiment, the loop thermosiphon system 500 can include two separate and distinct evaporator sections 502 in the inboard region which each lead an independent evaporator section in an outboard region of the housing assembly. In one embodiment, the loop thermosiphon system 500 can include a variation on the previously described embodiment which alternates the evaporator tubes to opposite condensers on opposite sides of the modular wall for diversity. In one embodiment, the loop thermosiphon system 500 can include routing of the evaporator section 502 to a single condenser section, which could be positioned at any suitable location on the housing assembly, such as in one of the outboard regions of the modular walls. In one embodiment, the loop thermosiphon system 500 can include an evaporator chamber instead of individual tubes for the evaporator section 502.

Figure 10:
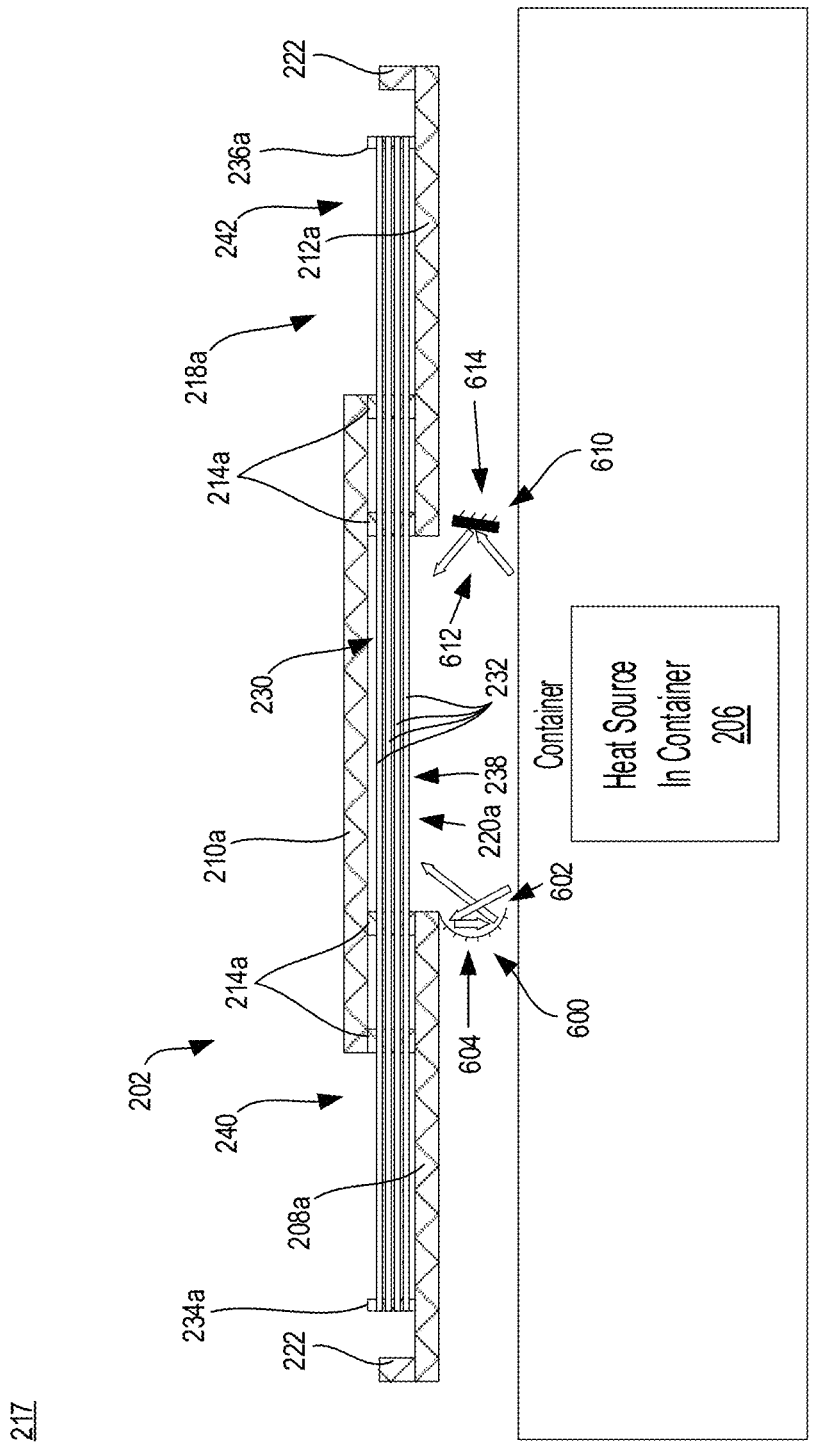
FIG. 10 illustrates reflectors configured to direct and amplify heat from a heat source toward an evaporator section of a passive temperature control system, according to at least one aspect of the present disclosure.

Referring now to FIG. 10, a modular wall 202 and a heat source 206 are provided, according to at least one aspect of the present disclosure. In one aspect, the modular wall 202 and heat source 206 can be similar to other modular walls and heat sources disclosed herein. In one aspect, the amount of heat emitted from the heat source 206 to the evaporator section 238 of the passive temperature control system 230 can be directed and amplified. In various embodiments, reflectors can be positioned intermediate the heat source 206 and the evaporator sections 238.

In one aspect, the reflectors can comprise parabolic reflectors 600, which include a reflective portion 602 and an insulative portion 604 on an opposite side thereof. The parabolic reflector 600 can redirect and amplify the heat emitted from the heat source toward the evaporator section 238, which can increase the systems ability to remove heat from within the housing assembly via the passive temperature control system 230. In one aspect, the reflectors can comprise plate reflectors 610, which include a reflective portion 612 and an insulative portion 614 on an opposite side thereof. The plate reflectors 610 can redirect and amplify the heat from the heat source toward the evaporator section 238, which can increase the systems ability to remove heat from within the housing assembly via the passive temperature control system 230. The use of the reflectors can increase the amount heat emitted from the heat source 206 to the evaporator section 238 that is outside of the direct view factor of the heat source. The reflectors can redirect heat towards the evaporator section 238 that may have otherwise not reached the evaporator section 238. In one aspect, the use of insulative portions on the reflectors can mitigate heat losses from occurring through the reflectors.

Figure 11:
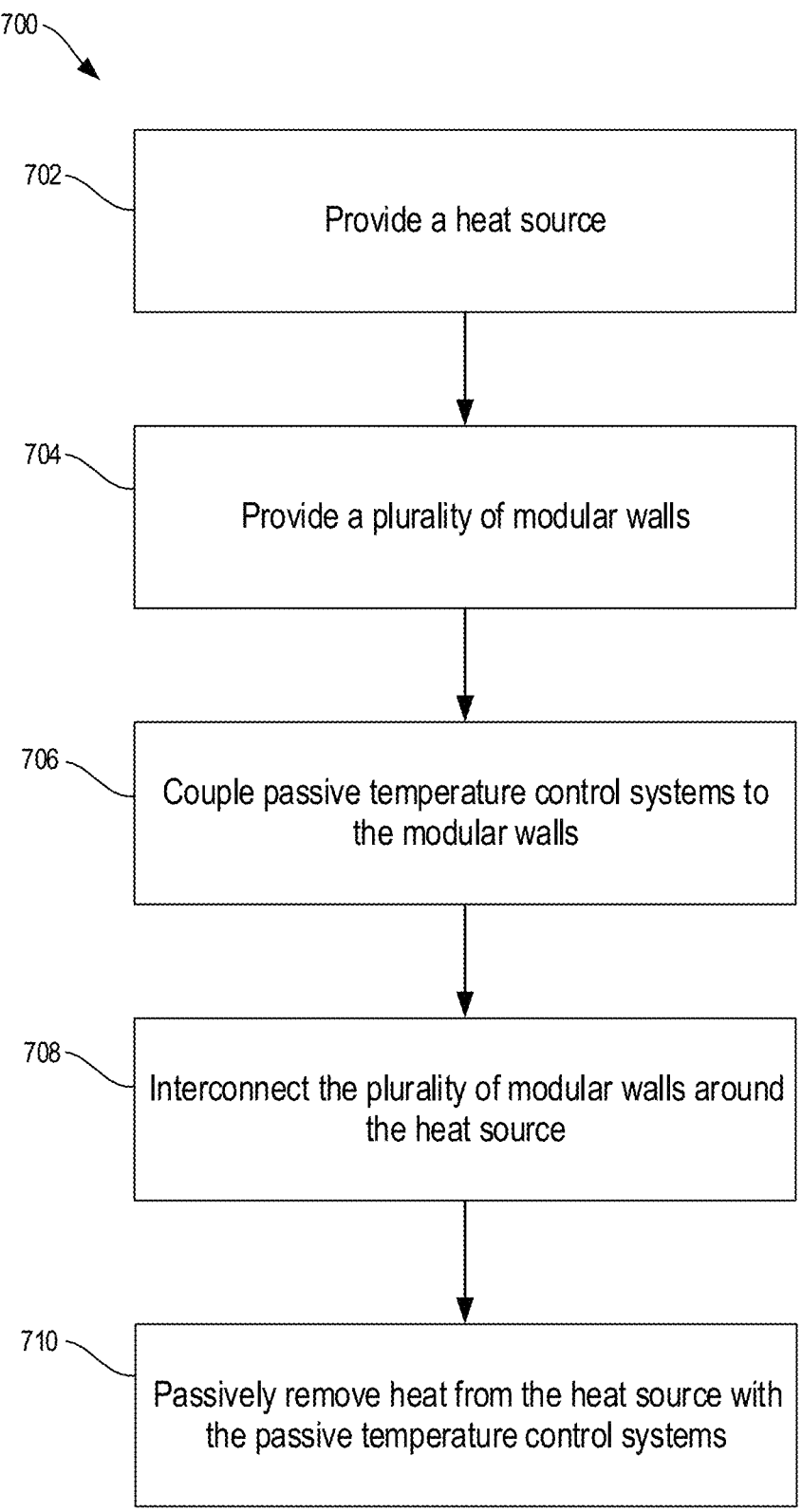
FIG. 11 illustrates a method of assembling a housing assembly, according to at least one aspect of the present disclosure.

Referring now to FIG. 11, a method 700 is provided for assembling a housing assembly, according to at least one aspect of the present disclosure. In one aspect, the method 700 can include providing 702 a heat source, such as heat source 206, in which heat is to be removed. The method 700 can further include providing 704 a plurality of modular walls. In one aspect, the modular walls can be modular walls 202, 204, modular roof assembly 250, modular base assembly, or any other suitable modular walls or segments described elsewhere herein for defining a housing assembly around the heat source. The method 700 can further include coupling 706 passive temperature control systems to the modular walls. In one aspect, the passive temperature control systems can comprise any passive temperature control systems, such as passive temperature control systems 230, 330, 430, disclosed herein, such as heat pipes 232, 332*a*, 332*b*, 432*a*, 432*b* or the loop thermosiphon system 500, as examples. The method 700 can further include interconnecting 708 the plurality of modular walls around the heat source. In one aspect, interconnecting the plurality of modular walls can include using wall couplers to interconnect the modular walls to define the housing assembly in which the heat source is positioned within. The method 700 can further include passively 710 removing heat from the heat source with the passive temperature control systems, as is described elsewhere herein.

The above-provided disclosure provides an improved method to achieve higher heat removal that is present in micro-reactors utilizing thermal radiation, which improves greatly upon air removal through natural convection of air. For this invention to meet the needed levels, the increased view factor for heat transfer as well as maximizing the heat transfer surface areas is essential to this design. Embodiments of the design for the evaporator and condenser regions of the heat pipes and/or loop thermosiphons include embedding those regions in the shielding material as well. Thus, the shielding material acts as surface area for the collection/distribution of heat as well as providing thermal, radioactive, and protective barriers.

While the above-provided passive temperature control system was described in the context of transferring heat from within a housing assembly to the ambient environment surrounding the housing assembly, it should be understood that the passive temperature control system can function in an opposite manner. Stated another way, the passive temperature control system can transfer heat from the ambient environment surrounding the housing assembly to within the housing assembly. The flow of heat within the passive temperature control system can depend upon the temperature difference between the inside of the housing assembly and the ambient environment surrounding the housing assembly. In an instance where the temperature of the ambient environment is greater than the temperature of the inside of the housing assembly, the condenser sections of the heat pipes and loop thermosiphons can act as evaporator sections and the evaporator sections of the heat pipes can act as condenser sections such that heat is transferred into the housing assembly.

While the heat pipes are shown as being arranged in the horizontal orientation while extending along the modular walls, in other example embodiments, the heat pipes can have other orientations along the modular walls, such as an angled orientation. In other example embodiments, the heat pipes can be arranged in a vertical orientation in embodiments where the wall segments are arranged in a vertical orientation instead of a horizontal orientation, as is shown in FIGS. 3-8, as an example. In addition, while the heat pipes are shown as being positioned within the footprint of the modular walls, in other example embodiments, the heat pipes can extend beyond the footprints of the modular walls to further include the view factor and surface area in which the heat pipes can release heat from within the housing assemblies to the ambient environment surrounding the housing assembly.

While this invention is not specific to the shipping container applications, one embodiment of the design of the modular walls is such that they are sized to fit within a shipping container and provided as a kit for ease of delivery and installation, as is illustrated in FIG. 12. As shown in FIG. 12, the modular walls can be provided with different passive temperature control systems depending on the application in which the housing assembly is to be utilized. While the kit illustrated in FIG. 12 illustrates modular walls 202, 204, it should be understood that the kits can include any suitable number of modular walls and wall segments needed to define a housing assembly around a heat source. In one example, embodiment, the kit can include modular sidewalls, a modular roof assembly, and a modular base assembly, along with the passive temperature control systems for each of the modular walls. The kits could also include replacement components in the event that a component of the modular walls, such as a wall segment, a wall coupler, a component of the passive temperature control system etc., is damaged.

The above-provided disclosure provides an increased amount of heat removal compared to that of the passive natural convection cooling path. Utilizing a natural convection with the aid of heat pipes and/or loop thermosiphons drastically improves the effectiveness of cooling. In one aspect, the above-provided disclosure removes some of the thermal barriers that currently exist for passive cooling of micro-reactors and increases the view factor to accommodate the high heat flux that a micro-reactor has. This implementation of the modular walls with integral passive cooling methods also provides a protective structure, thermal barrier, and a radioactive barrier. This simplifies/reduces the number of needed components to provide necessary cooling and protections that a micro-reactor requires.

The passive temperature control system is designed such that heat removal can be accomplished with mechanically coupling to the source from which the heat is being transferred. The self-regulating heat transfer capabilities of the heat pipes and/or thermosiphon systems in addition to natural convection increases the reliability of the micro-reactor design.

The integration of the cooling method to a modular wall allows for easy of manipulation and installation of the system. The interlocking feature of the modular walls allows for precise assembly of the housing assembly. As referenced elsewhere herein, the above-provided disclosure allows for the housing assembly around any source of heat or cold that can benefit from transferring heat to or from the ambient environment passively. While the passive temperature control system is passive in nature, other embodiments are envisioned where active component (e.g. fans, blowers, water mist, etc.) can improve the efficiency of the system.

Various aspects of the subject matter described herein are set out in the following examples.

Example 1—A housing assembly configured to house a reactor, the housing assembly comprising a plurality of modular walls and a passive temperature control system. The plurality of modular sidewalls are configured to surround the reactor. The plurality of modular walls comprises a first modular wall. The passive temperature control system is coupled to the first modular wall. The passive temperature control system is configured to transfer heat between the reactor and an area around the housing assembly.

Example 2—The housing assembly of Example 1, wherein the first modular wall comprises a first outboard region exposed to the area around the housing assembly, a second outboard region exposed to the area around the housing assembly, and an inboard region exposed to the reactor, wherein the inboard region is positioned intermediate the first outboard region and the second outboard region.

Example 3—The housing assembly of Examples 1 or 2, wherein the passive temperature control system comprises a plurality of heat pipes.

Example 4—The housing assembly of Example 3, wherein the plurality of heat pipes comprises a first heat pipe configured to extend from the first outboard region to the second outboard region.

Example 5—The housing assembly of Example 3, wherein the plurality of heat pipes comprises a first heat pipe configured to extend from the first outboard region to a first location in the inboard region and a second heat pipe configured to extend from the second outboard region to a second location in the inboard region.

Example 6—The housing assembly of Example 5, wherein the first location is positioned closer to the first outboard region than the second outboard region and the second location is positioned closer to the second outboard region than the first outboard region.

Example 7—The housing assembly of Example 6, wherein the first location is positioned closer to the second outboard region than the first outboard region and the second location is positioned closer to the first outboard region than the second outboard region.

Example 8—The housing assembly of any one of Examples 1-7, wherein the passive temperature control system comprises a loop-thermosiphon system.

Example 9—The housing assembly of Example 8, wherein the loop-thermosiphon system comprises a first outboard heat exchange section positioned in the first outboard region, a first inboard heat exchange section positioned in the inboard region, wherein the first inboard heat exchange section is in thermal communication with the first outboard heat exchange section, a second outboard heat exchange section positioned in the second outboard region, and a second inboard heat exchange section positioned in the inboard region, wherein the second inboard heat exchange section is in thermal communication with the second outboard heat exchange section.

Example 10—The housing assembly of Example 8, wherein the loop-thermosiphon system comprises a first outboard heat exchange section positioned in the first outboard region, a second outboard heat exchange section positioned in the second outboard region, and a common inboard heat exchange section positioned in the inboard region, wherein the common inboard heat exchange section is in thermal communication with the first outboard heat exchange section and the second outboard heat exchange section.

Example 11—The housing assembly of any one of Examples 2-10, further comprising a reflector configured to direct heat between the reactor and the inboard region.

Example 12—The housing assembly of any one of Examples 1-11, wherein plurality of modular walls further comprises a second modular wall configured to removably couple to the first modular wall.

Example 13—The housing assembly of Example 12, wherein the passive temperature control system is a first passive temperature control system, wherein the second modular wall comprises a second passive temperature control system coupled to the second modular wall, and wherein the second passive temperature control system is configured to transfer heat between the reactor and the area around the housing assembly.

Example 14—The housing assembly of any one of Examples 1-13, wherein the plurality of modular walls are configured to provide thermal and radioactive shielding.

Example 15—The housing assembly of any one of Examples 1-14, wherein the passive temperature control system is embedded in the first modular wall.

Example 16—A kit for housing a reactor, the kit comprising a plurality of modular walls, a first passive temperature control system, and a second passive temperature control system. The plurality of modular walls are configured to interconnect and surround the reactor. The plurality of modular walls comprises a first modular wall and a second modular wall configured to removably couple to the first modular wall. The first passive temperature control system is coupled to first modular wall. The first passive temperature control system is configured to transfer heat between the reactor and an area surrounding the interconnected modular walls. The second passive temperature control system is coupled to second modular wall. The second passive temperature control system is configured to transfer heat between the reactor and an area surrounding the interconnected modular walls.

Example 17—The kit of Example 16, wherein the first passive temperature control system comprises a plurality of heat pipes.

Example 18—The kit of Example 16, wherein the first passive temperature control system comprises a loop thermosiphon system.

Example 19—A housing assembly configured to house a reactor, the housing assembly comprising a modular sidewall assembly, a modular roof assembly, a modular base assembly, and a passive temperature control system coupled to one of the modular sidewall assembly, the modular roof assembly, or the modular base assembly. The modular sidewall assembly comprises a plurality of releasably connectable modular sidewalls. The modular sidewall assembly, the modular roof assembly, and the modular base assembly are configured to interconnect and encompass the reactor. The passive temperature control system is configured to transfer heat between the reactor and an area around the housing assembly.

Example 20—The housing assembly of Example 19, wherein the passive temperature control system comprises a first passive temperature control system, wherein the housing assembly further comprises a second passive temperature control system coupled to one of the modular sidewall assembly, the modular roof assembly, or the modular base assembly, wherein the second passive temperature control system is configured to transfer heat between the reactor and the area around the housing assembly.

Unless specifically stated otherwise as apparent from the foregoing disclosure, it is appreciated that, throughout the foregoing disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

The term "substantially", "about", or "approximately" as used in the present disclosure, unless otherwise specified, means an acceptable error for a particular value as determined by one of ordinary skill in the art, which depends in part on how the value is measured or determined. In certain embodiments, the term "substantially", "about", or "approximately" means within 1, 2, 3, or 4 standard deviations. In certain embodiments, the term "substantially", "about", or "approximately" means within 50%, 20%, 15%, 10%, 9%, 8%, 7%, 6%, 5%, 4%, 3%, 2%, 1%, 0.5%, or 0.05% of a given value or range.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. A housing assembly configured to house a nuclear reactor, the housing assembly comprising:

a plurality of removably coupleable modular walls configured to surround the nuclear reactor, wherein the plurality of modular walls comprises a first modular wall, comprising:
  a first wall segment comprising a first surface to face an area around the housing assembly; and
  a second wall segment coupled to the first wall segment, wherein the second wall segment comprises a second surface to face the nuclear reactor; and
a passive temperature control system coupled to the first modular wall, wherein the passive temperature control system is configured to transfer heat between the nuclear reactor and the area around the housing assembly, and wherein the passive temperature control system extends in between the first surface and the second surface.

2. The housing assembly of claim 1, wherein the first modular wall further comprises a third wall segment coupled to the second wall segment, wherein the third wall segment comprises a third surface facing the area around the housing assembly.

3. The housing assembly of claim 2, wherein the passive temperature control system comprises a plurality of heat pipes.

4. The housing assembly of claim 3, wherein the plurality of heat pipes comprises a heat pipe configured to extend from the first surface to the third surface.

5. The housing assembly of claim 3, wherein the plurality of heat pipes comprises:
  a first heat pipe configured to extend from the first surface to a first location at the second surface; and
  a second heat pipe configured to extend from the third surface to a second location at the second surface.

6. The housing assembly of claim 5, wherein:
  the first location is positioned closer to the first surface than the second surface; and
  the second location is positioned closer to the second surface than the first surface.

7. The housing assembly of claim 5, wherein:
  the first location is positioned closer to the second surface than the first surface; and
  the second location is positioned closer to the first surface than the second surface.

8. The housing assembly of claim 2, wherein the passive temperature control system comprises a loop-thermosiphon system.

9. The housing assembly of claim 8, wherein the loop-thermosiphon system comprises:
  a first outboard heat exchange section positioned on the first surface;
  a first inboard heat exchange section positioned on the second surface, wherein the first inboard heat exchange section is in thermal communication with the first outboard heat exchange section;
  a second outboard heat exchange section positioned on the third surface; and
  a second inboard heat exchange section positioned on the second surface, wherein the second inboard heat exchange section is in thermal communication with the second outboard heat exchange section.

10. The housing assembly of claim 8, wherein the loop-thermosiphon system comprises:
  a first outboard heat exchange section positioned on the first surface;
  a second outboard heat exchange section positioned on the third surface; and
  a common inboard heat exchange section positioned on the second surface, wherein the common inboard heat exchange section is in thermal communication with the first outboard heat exchange section and the second outboard heat exchange section.

11. The housing assembly of claim 1, further comprising a reflector configured to direct heat between the nuclear reactor and the second surface.

12. The housing assembly of claim 1, wherein plurality of modular walls further comprises a second modular wall configured to removably couple to the first modular wall.

13. The housing assembly of claim 12, wherein the passive temperature control system is a first passive temperature control system, wherein the housing assembly further comprises a second passive temperature control system coupled to the second modular wall, and wherein the second passive temperature control system is configured to transfer heat between the nuclear reactor and the area around the housing assembly.

14. The housing assembly of claim 1, wherein the plurality of modular walls are configured to provide thermal and radioactive shielding.

15. The housing assembly of claim 12, wherein the first modular wall comprises a first wall coupler, and wherein the second modular wall comprises a second wall coupler configured to engage the first wall coupler to removably couple the second modular wall to the first modular wall.

16. The housing assembly of claim 15, wherein the first wall coupler comprises a first aligning surface, wherein the second wall coupler comprises a second aligning surface, and wherein the first aligning surface is configured to engage the second aligning surface to align the first modular wall with the second modular wall.

17. The housing assembly of claim 11, wherein the reflector comprises a parabolic reflector.

18. A housing assembly configured to house a nuclear reactor, the housing assembly comprising:
  a plurality of removably coupleable modular walls configured to surround the nuclear reactor, wherein the plurality of modular walls comprises a first modular wall, comprising:
    a first wall segment comprising a first surface to face an area around the housing assembly; and
    a second wall segment coupled to the first wall segment, wherein the second wall segment comprises a second surface to face the nuclear reactor, and wherein the second wall segment is offset from the first wall segment to define a gap therebetween; and
  a heat pipe extending from the first wall segment to the second wall segment through the gap.

19. The housing assembly of claim 18, wherein the heat pipe comprises a first heat pipe, wherein the gap comprises a first gap, and wherein first modular wall further comprises:
  a third wall segment coupled to the second wall segment, wherein the third wall segment comprises a third surface to face the area around the housing assembly, and wherein the third wall segment is offset from the second wall segment to define a second gap therebetween; and
  a second heat pipe extending from the second wall segment to the third wall segment through the second gap.

20. The housing assembly of claim 19, wherein the first heat pipe is coupled to the second wall segment at a first location that is a first distance from the first wall segment, wherein the second heat pipe is coupled to the second wall segment at a second location that is a second distance from the first wall segment, and wherein the first distance is less than the second distance.

* * * * *